(No Model.)
H. W. & J. F. COWAN.
Bee Hive.
No. 237,676. Patented Feb. 15, 1881.
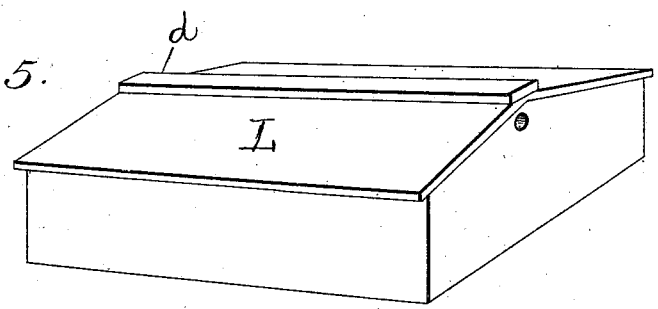
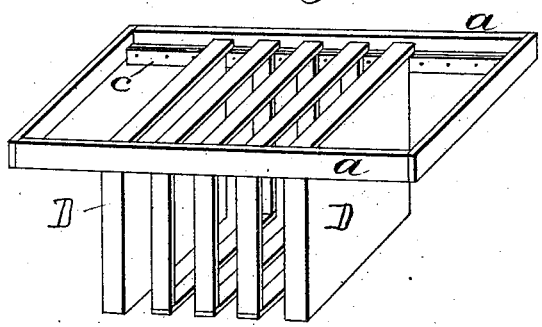
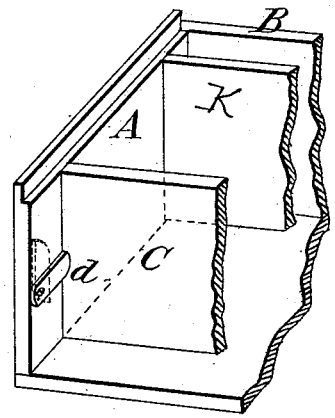
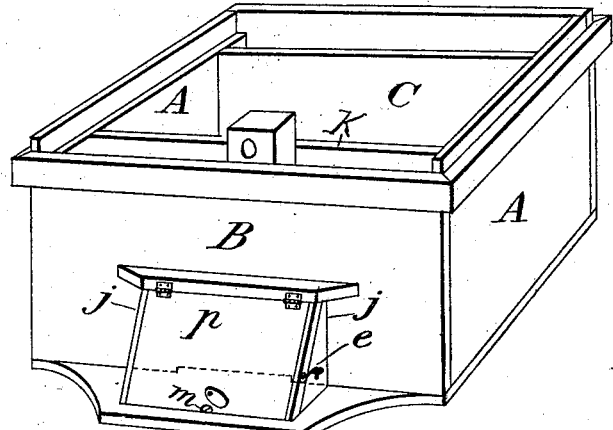
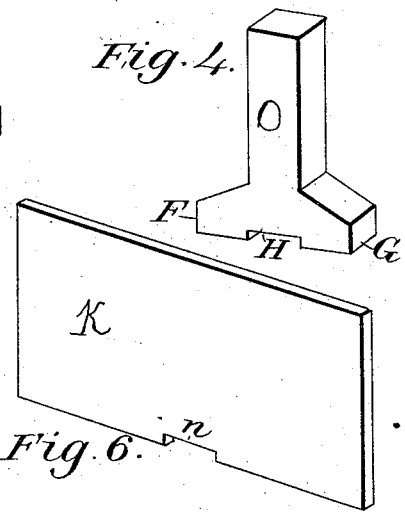
Witnesses:
Richard G. Cowan
Samuel Copeland
Inventors.
Harry W Cowan
John F. Cowan
N. PETERS, PHOTO-LITHOGRAPHER, WASHINGTON, D. C.

UNITED STATES PATENT OFFICE.

HARRY W. COWAN AND JOHN F. COWAN, OF WELLINGTON, ILLINOIS.

BEE-HIVE.

SPECIFICATION forming part of Letters Patent No. 237,676, dated February 15, 1881.

Application filed July 10, 1880. (No model.)

*To all whom it may concern:*

Be it known that we, HARRY W. COWAN and JOHN F. COWAN, citizens of the United States, residing at Wellington, in the county of Iroquois and State of Illinois, have invented certain new and useful Improvements in Bee-Hives; and we do hereby declare the following to be a full, clear, and exact description of the invention, such as will enable others skilled in the art to which it appertains to make and use the same, reference being had to the accompanying drawings.

Our invention relates to that class of movable frame bee-hives in which the frames are suspended, their top bars resting in rabbets or otherwise suspended from the top of the hive.

The object of our invention is, first, by the use of frame-holders to readily change the hive from a single-wall hive in summer to a double-wall hive in winter; second, by having the comb-frames and division-boards suspended in the frame-holder, facilitate cleaning the hives, inspecting, and transferring; third, by the use of manipulating back, render the use of division-boards perfectly easy; fourth, by the use of entrance-extension, keep wind and storm out of the hive in winter, and also prevent spring dwindling and robbing. We obtain these objects by the mechanism illustrated in accompanying drawings, in which—

Figure 1 represents the frame-holder and manner of suspending comb-frames and division-boards. Fig. 2 is a perspective view of the hive arranged to receive the frame-holder, also showing the entrance-extension; Fig. 3, sectional back view, showing button and mode of operating. Fig. 4 is a view of the key or entrance-bridge. Fig. 5 is a view of the cap or cover of the hive. Fig. 6 represents notched board K or front inner wall.

Similar letters refer to similar parts throughout the several views.

The frame-holder is made the proper width to accommodate the length of comb-frame used and long enough to allow the ends of the the frame-holder to rest in the rabbet in the end of the hive. (See Fig. 2.) The side pieces, *a a*, are rabbeted to form a rest for the frames, and on shoulders, on which the frames rest, we nail strips of tin, *c*, which run the length of the frame-holder. This is to protect the joint formed by the frame-holder resting on the front board and manipulating back. We arrange the hive for the frame-holder without reference to the length or depth; but it must be enough wider than the frame-holder to allow a space (an inch or more) on each side of it.

On the top edge of the ends of the hive A A (see Fig. 2) we cut rabbets to correspond in depth to the frame-holder, or a cleat may be nailed on each end of the hive to serve the same purpose. The front board, B, is cut so that its top edge will join even with the lower edge of the rabbet.

The manipulating-back C is a plain board cut the length of the inside of the hive, and, like the front board, must be cut so that its top edge will join even with the rabbet in the ends of the hive. This board is held in position against the ends of the division-boards D D, (or, if division-boards are not used, a narrow strip is nailed vertically on each end of the hive, in front of the board C, in such position that they will hold the board C the proper distance from the frames) by a button on each end of the hive, as shown in sectional view. (See Fig. 3.) The buttons *d* are made long enough so that, when the frame-holder is in position for summer, by turning them down horizontally they will force the manipulating-back tight against the division-boards, and wide enough that when turned up vertically they will hold the manipulating-back the proper distance from the back of the hive. To make the desired space for winter we use a duplicate of the manipulating-back (see Fig. 6) to make a front inside wall, K. This board has an entrance-slot, *n*, cut in the lower edge, to correspond to the entrance in the front of the hive.

The key or entrance-bridge (see Fig. 4) is made the thickness of the space between the front of the hive and the inside wall, K, and should measure across the large end (from F to G) a little longer than the entrance-slot in the front of the hive, so that when placed in position it will effectually cover said entrance-slot. The small entrance-slot H is to make the passage continuous from the outside to the interior of the hive. The entrance-extension (see Fig. 2) is made by nailing the several pieces together independent of the hive, and is attached to the hive by screws. The lighting-board $i$ is made enough wider than the beveled sides $j\ j$ so that when the lid P is down it will project at least one inch in front.

The lid P is fastened to the top bar with hinges, and is fastened down or vertically against the front of the hive with small hook $e$. The small entrance $m$ is governed by a button, to be used when the lid is closed.

The cap or cover of the hive (see Fig. 5) is made removable from the main body of the hive, and being so wide requires a roof to pitch both ways, and capped on the peak at $d$ to make it water-proof, and is ventilated with a hole in each end covered with wire-cloth.

The manner of operating the hive is as follows: For summer, the frame-holder is placed so that its front side rests squarely on the front board of the hive; then place the manipulating-back in the hive against the division-boards, now turn down the buttons $d\ d$ against it, which forces it firmly into position against the division-boards.

By raising the buttons, which loosens the manipulating-back, the division-boards can be used without the usual jarring, which is the case where the front and back boards of the hive are stationary.

If the hive requires cleaning, lift out the frame-holder with frames, bees, and division-boards, and place them into another hive or receptacle until the hive is cleaned out, after which they can be returned to the hive.

For winter, turn the buttons vertically, slide the frame-holder back until the manipulating-back strikes the buttons; now place the duplicate of the manipulating-back under the front side of the frame-holder, then place the key or entrance-bridge O, large end down, between the front of the hive and the inside wall. We now have a double-wall hive, having spaces that may be filled with straw or chaff.

For winter, the entrance-lid is closed to keep out cold winds and storms generally. The small entrance $m$ will be open to admit air.

In the spring or fall, if the bees show a disposition to rob, keep the lid closed and use the small entrance, which is easily guarded by the bees. In the same manner we prevent spring dwindling, as the bees will not be enticed out unless the weather is sufficiently warm to admit of their doing so with safety.

We are aware that previous to our invention double-wall hives and chaff-hives have been made, and that manipulating-boards have been used for different purposes; but What we do claim as our invention, and desire to secure by Letters Patent, is—

1. The combination of the hive-body A and the removable frame-holder $a$, resting on said hive-body, with the comb-frames and division-boards suspended by and depending below said frame into the hive-body.

2. The combination, with a hive-body, of the movable back C, buttons $d$, notched board K, and key or bridge O, as described.

3. The combination of the hive-body A with the lighting-board $i$, the beveled sides $j\ j$, top bar and lid P, with small entrance $m$, as described.

HARRY W. COWAN.
JOHN F. COWAN.

Witnesses:
RICHARD G. COWAN,
HENRY CROWTHER.